Dec. 23, 1969  A. COSTANTINI  3,485,371
VALVE ASSEMBLY

Filed Jan. 5, 1968

INVENTOR
Adelmo Costantini
BY
Boret & Boret
ATTORNEYS

United States Patent Office 3,485,371
Patented Dec. 23, 1969

3,485,371
VALVE ASSEMBLY
Adelmo Constantini, Yonkers, N.Y., assignor to Lawler Automatic Controls, Inc., Mount Vernon, N.Y., a corporation of New York
Filed Jan. 5, 1968, Ser. No. 696,045
Int. Cl. B01d 35/28, 35/00
U.S. Cl. 210—135                     5 Claims

ABSTRACT OF THE DISCLOSURE

The application discloses a check valve having a valve plug on each side of a valve opening provided in an interior partition dividing the inlet and outlet compartments of the valve. One valve plug is normally open and mounted on an axially moveable stem, the plug being used to shut off the valve for repair purposes. The second plug serves as a check valve and is slidably mounted on the stem. The second plug is coupled by a check spring to a removable cover threadably disposed in an access opening in the outlet compartment of the valve. The stem is moved axially in the cover by threaded engagement within a bore provided in the cover and the threads for such engagement and those of the cover in the access opening have identical pitch. A removable strainer is also provided in said outlet compartment being removable therefrom through said opening.

---

This invention relates to improvements in valves which provide a stop feature and access to interior compartments thereof for the purpose of removing operative components so that they may be repaired or replaced entirely by their new or reconstructed equivalents.

In order to have access into valves which are functionally associated with fluid flow systems, the fluid must be inhibited in the system either at some point between the valve and the fluid source or in some manner within the valves themselves. As disclosed, for example, in Patent No. 2,005,445, the prior art teaches specific means inside the valve structure for shutting down check valves for the specific purpose of removing a screen type filter or strainer in the outer compartment thereof, such means incorporating elements which themselves wear in usage and, therefore, ultimately require repair or replacement. It is a desideratum of the present invention to provide a control valve which serves additionally as a stop valve and which is so arranged as to permit, while the valve is shut down, the withdrawal of those operating parts which are located in the valve assembly section. This section may or may not have disposed therein an element for filtering or screening the fluid in advance of its output port. To that end, the stop valve, as contemplated by the present invention, provides a shut-off assembly which is in part structurally separate from and in function independently operative of the control valve assembly so that components of the latter may be removed and replaced while the valve is completely shut down by the stop valve components as contained within the valve structure. In one form of this invention, the control valve assembly functions as a check or one way fluid valve. Elements of the two assemblies are structurally interrelated in part providing shared components, thus yielding a compact mechanism which is efficient to operate and technically feasible and economical to manufacture.

One object of the present invention is to provide a valve having a stop feature which can be made operative independently of the other working components of the valve to permit valve repair during its shut down period of operation.

Figure 1:
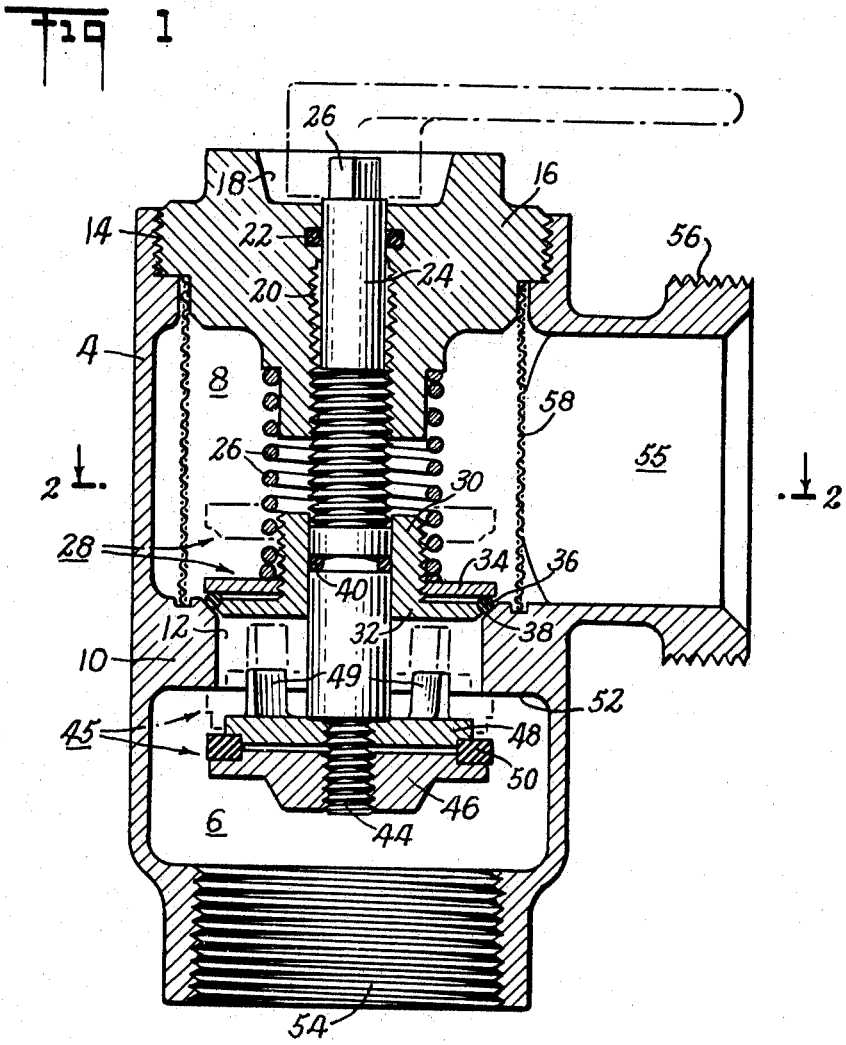
Figure 2:
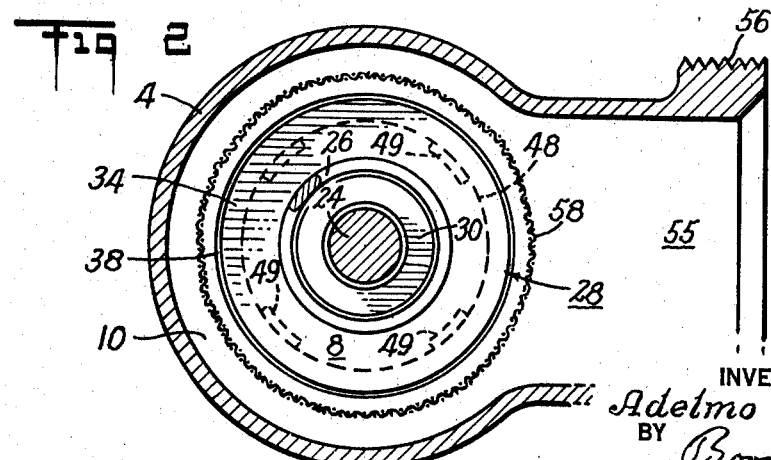

Other objects and advantages of the invention may be perceived on reading a more complete description of one embodiment thereof which is taken in conjunction with the drawing, FIG. 1 of which shows in elevated section a stop and check valve having provision for removing as desired its strainer and check valve components. FIG. 2 is a section taken on line 2—2 of FIG. 1.

As shown in the drawings the stop and check valve comprises an outer casing 4 enveloping fluid input and output compartment 6 and 8, respectively, which are separated by partition 10 in which there is disposed a valve opening 12.

At the top of the casing there is provided an internally threaded access opening 14 adapted to receive bonnet 16 having an hexagonally shaped top flange forming an interior recess 18 in the top of the bonnet. Centrally communicating with the recess is axial bore 20 which extends through the bonnet. The bore is threaded from the bottom thereof nearly to the recess 18, there being provided an O-ring gasket 22 about the bore between the recess and the threaded portion of the bore.

A valve shut-off stem 24 with a square head 26 and having external threads is adapted to engage the threads of bore 20, the threads being of the same pitch as those of the access opening 14. The stem is received in the bore and extends there through and through valve opening 12 into the fluid input compartment 6.

Loosely mounted on the stem 24 in the output compartment 8 and coupled to the bonnet by compression spring 26 is check valve assembly 28. The assembly 28 comprises a threaded stem shaft 30 and bottom flange 32 atop of which is disposed valve plate 34. A gasket 36 separates the flange and the plate at their periphery and the outer edge of the flange is bevelled for accommodation to valve seat 38 at the top of valve opening 12. Gasket 40 recessed in the stem 24 prevents fluid from entering the compartment 8 under pressures which are not sufficient to lift the check valve from its seat.

The shut-off stem 24 in provided with an externally threaded, axial extension 44 on which is screwed shut-off seat assembly 45 in the input compartment 6. The latter assembly comprises shut-off valve 46 and plate 48, having upstanding fingers 49 to assure alignment into valve opening 12, the valve and plate being separated by a large, pliable O-ring gasket 50 which is adapted to engage back seat surface 52 on the underside of the partition 10 when the valve is shut down. The valve casing 4 is internally bored at 54 for connection with input piping (not shown) and on the output side an opening 55 is externally threaded at 56 to permit of connection to an output pipe (not shown).

Between the casing 4 and the bonnet 6 there is maintained in position within the output compartment the top of an annular strainer or filter 58 the bottom of which is disposed in a small, circular recess formed in the top surface of the partition 10 which is integral with the casing.

In operation, the check valve assembly is operated exclusively in accordance with the thrust exerted by the fluid entering the valve, the thrust necessary to effect opening thereof being predetermined solely in accordance with the characteristics of the compression spring which couples the check valve to the bonnet 16. If it is desired to shut down the valve in order to remove the check valve assembly or the filter without permitting liquid flow there through, the shut-off valve assembly 45 is first raised by turning stem 24 to effect engagement of the assembly with the back seat surface of the partition 10. Then, in order to gain access to the valve for the desired removal of components, the bonnet is turned on the threads both of the stem 24 and those in the access opening 14 this being permitted due to their having the same pitch as heretofore mentioned. On removal of the bonnet, the check valve assembly 28, the compression spring 26, and the filter 58, may be lifted off the stem and withdrawn from the outer compartment of the valve as desired. The pressure of the incoming fluid will then maintain the shut-off valve in place to prevent liquid flow through the valve. On replacement of the components in the output compartment, including the bonnet, the shut-off valve assembly is lowered by turning the stem 24 until it is in its lowered position permitting fluid access to the valve opening 12 and the output sections of the valve.

Various modifications of the invention may be effected by persons skilled in the art without departing from the scope and principle thereof as defined in the appended claims.

What is claimed is:

1. A valve assembly comprising a casing having an input compartment, an output compartment and an access opening in communication with said output compartment, a removable cover disposed in said access opening, a partition having a valve opening and dividing said compartments, a valve stem being longitudinally, movably mounted relative to said cover and extending through said cover, said output compartment, said opening and into said input compartment, means to raise the valve stem relative to the cover, a valve slidably mounted on the stem being connected to said cover and adapted to be seated in said valve opening on the output compartment side thereof, said slidably mounted valve, said valve stem and said removable cover being so constructed and arranged to permit removal of said slidably mounted valve through said access opening, and a shut-off valve fixedly mounted on the end of the stem in the input compartment and adapted to be raised by said stem against said partition to close off said valve opening to prevent liquid from flowing through the valve assembly on the removal of said first mentioned valve.

2. A valve assembly as defined in claim 1, wherein a coupling spring is provided to connect the valve to the cover whereby said valve may serve as a check or one way valve.

3. A valve assembly as defined in claim 2 wherein a filter is disposed in the output compartment of said assembly.

4. A valve assembly as defined in claim 2 wherein said cover is in threaded connection with said casing and said stem is threadably mounted within a bore provided in said cover, the pitch of the cover receiving threads in said casing and the internal threads in the bore of said cover being substantially the same.

5. A valve assembly as defined in claim 4 wherein the valve coupled to the cover is slidably mounted on the outside of said stem in the output compartment of said assembly.

References Cited

UNITED STATES PATENTS

| | | | |
|---|---|---|---|
| 538,502 | 4/1895 | Byrne | 137—614.21 X |
| 888,817 | 5/1908 | Kapenos | 137—614.21 X |
| 1,220,231 | 3/1917 | Jack | 210—234 |
| 2,344,354 | 3/1944 | Hallerstrom et al. | 137—614.21 |
| 3,273,715 | 9/1966 | Rosaen | 210—234 X |
| 3,363,762 | 1/1968 | Ensign | 210—234 X |

FOREIGN PATENTS

| | | |
|---|---|---|
| 227,215 | 1/1925 | Great Britain. |

REUBEN FRIEDMAN, Primary Examiner

C. M. DITLOW, Assistant Examiner

U.S. Cl. X.R.

137—614.2; 210—136, 234